United States Patent
Abu-Jdayil et al.

(10) Patent No.: US 11,255,052 B1
(45) Date of Patent: Feb. 22, 2022

(54) THERMAL INSULATING MATERIAL MADE FROM DATE PALM SURFACE FIBERS

(71) Applicant: UNITED ARAB EMIRATES UNIVERSITY, Al Ain (AE)

(72) Inventors: Basim Abu-Jdayil, Al Ain (AE); Mohsin Raza, Al Ain (AE); Hyder Al Abdallah, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/038,016

(22) Filed: Sep. 30, 2020

(51) Int. Cl.
*D21J 1/20* (2006.01)
*E04B 1/76* (2006.01)
*D21J 3/00* (2006.01)
*E04B 1/74* (2006.01)

(52) U.S. Cl.
CPC . *D21J 1/20* (2013.01); *D21J 3/00* (2013.01); *E04B 1/76* (2013.01); *E04B 2001/745* (2013.01)

(58) Field of Classification Search
CPC ......... D21J 1/20; D21J 3/00; E04B 2001/745; E04B 1/76; E04B 1/88; E04B 2001/742; B29C 43/02; E04C 2/16
See application file for complete search history.

(56) References Cited

U.S. PATENT DOCUMENTS

| | | | |
|---|---|---|---|
| 4,947,611 A * | 8/1990 | Otsuka | E04C 2/16 52/745.05 |
| 8,980,145 B2 * | 3/2015 | Baroux | B27N 9/00 264/40.1 |
| 9,347,216 B2 * | 5/2016 | Abu-Jdayil | E04B 1/76 |
| 10,655,009 B1 * | 5/2020 | Abu-Jdayil | B29B 7/92 |
| 10,808,366 B2 * | 10/2020 | Tetrault | B32B 5/02 |
| 2006/0054292 A1 * | 3/2006 | Yeh | D21C 5/00 162/218 |
| 2008/0179790 A1 * | 7/2008 | Wong | B27N 3/20 264/325 |

(Continued)

FOREIGN PATENT DOCUMENTS

| | | |
|---|---|---|
| CN | 106243542 A | 12/2016 |
| CN | 108552845 A | 9/2018 |

(Continued)

OTHER PUBLICATIONS

Chen et al., in "Windmill Palm Fiber/Polyvinyl Alcohol Coated Nonwoven Mats with Sound Absorption Characteristics," BioResources 11(2) pp. 4212-4225. (Year: 2016).*

(Continued)

*Primary Examiner* — Jose A Fortuna
(74) *Attorney, Agent, or Firm* — Nath, Goldberg & Meyer; Richard C. Litman

(57) ABSTRACT

A thermal insulating material made from date palm surface fibers and a method of manufacturing the thermal insulating material using waste material from the date palm tree is provided. The thermal insulating material includes date palm surface fibers and polyvinyl alcohol. The method may include softening date palm surface fibers (DPSF), drying the DPSF, infusing the DPSF with polyvinyl alcohol (PVA), and casting the PVA infused DPSF to produce the thermal insulating material made from date palm surface fibers. The thermal insulating material has a low thermal conductivity, demonstrating its suitability to insulating structures.

4 Claims, 2 Drawing Sheets

(56) References Cited

U.S. PATENT DOCUMENTS

| | | | | |
|---|---|---|---|---|
| 2013/0105746 | A1* | 5/2013 | Carpanzano | C04B 18/248 252/601 |
| 2013/0284387 | A1* | 10/2013 | Umemoto | C08L 1/12 162/9 |
| 2013/0300015 | A1* | 11/2013 | Baroux | B29C 43/003 264/40.1 |
| 2014/0343197 | A1* | 11/2014 | Guha | C08J 5/045 524/35 |
| 2015/0137023 | A1* | 5/2015 | Abu-Jdayil | C08K 11/005 252/62 |
| 2015/0345132 | A1* | 12/2015 | Huang | C04B 30/02 252/62 |
| 2016/0192607 | A1* | 7/2016 | Kitagawa | A01G 9/143 47/62 E |
| 2018/0297251 | A1* | 10/2018 | Maruyama | B60R 13/02 |
| 2019/0040593 | A1* | 2/2019 | Tetrault | B32B 5/02 |
| 2019/0194870 | A1* | 6/2019 | Kuo | D21H 19/20 |
| 2019/0202100 | A1* | 7/2019 | Thomas | B29B 9/14 |
| 2020/0189256 | A1* | 6/2020 | Field | B32B 7/12 |
| 2020/0231370 | A1* | 7/2020 | Appleford | D21J 7/00 |
| 2020/0239199 | A1* | 7/2020 | Kuo | B65D 43/0208 |

FOREIGN PATENT DOCUMENTS

| | | | | |
|---|---|---|---|---|
| CN | 110655769 | A | | 1/2020 |
| CN | 110790583 | A | | 2/2020 |
| EP | 1634996 | A1 * | 3/2006 | ............... D21J 3/00 |
| JP | 07137150 | A | | 5/1995 |
| WO | WO-9632251 | A1 * | 10/1996 | ............... B32B 5/26 |

OTHER PUBLICATIONS

Al-Oqla et al., in "Processing and Properties of Date Palm Fibers and Its Composites" Springer, Hakeem et al Editors, Chapter 1, pp. 1-25. (Year: 2014).*

Ho et al., in "Critical factors on manufacturing processes of natural fibre composites," Elsevier Part B 43, pp. 3549-3562. (Year: 2012).*

* cited by examiner

THERMAL INSULATING MATERIAL MADE FROM DATE PALM SURFACE FIBERS

BACKGROUND

1. Field

The disclosure of the present patent application relates to a thermal insulating material synthesized from date palm surface fibers and to a method of making a thermal insulating material using date palm surface fibers.

2. Description of the Related Art

Insulation of building structures is the most energy efficient method to protect against heat loss and increase energy efficiency across all sectors of the building industry. Thermal insulators are substances that hinder the flow of heat and exhibit very low thermal conductivity. Buildings insulated with thermal insulators are known to have very low heat flux compared to non-insulated buildings. The most commonly used types of thermal insulation materials are fiberglass, mineral wool, foams, polystyrene, and aerogels. Thermal insulators operate on the principle of positive net energy, that is to say the energy saved by using the thermal insulators over their lifetime is significantly greater than the energy expended manufacturing the thermal insulation material.

At present, the most commonly used thermal insulators are petroleum-derived insulation materials, including many polymers, due to their high thermal resistance. The most common building insulating materials like fiberglass, mineral wool, polystyrene (extended), or polyurethane (rigid form) also possess desirable physical properties (lower thermal conductivity, fire-resistance moisture protection); however, they are expensive to develop and are not suitable for the environment and human health. For example, a small interaction with the fiberglass or glass wool insulation material can cause serious respiratory issues. Conventional insulation materials like polystyrene, polyurethane, and mineral wool also suffer poor mechanical properties which require their further modification before being used as thermal insulating materials.

Thus, a thermal insulating material made from date palm surface b solving the aforementioned problems is desired.

SUMMARY

A thermal insulating material made from date palm surface fibers is manufactured using waste material from the date palm tree. The binding material used is both odor free and non-toxic in nature. The method of manufacturing the thermal insulating material is simple, cheap, easy to adopt, and environmentally safe. The thermal insulating material is highly efficient, biodegradable, and non-lethal for human health. The thermal insulating material has great potential to replace the expensive and toxic insulating materials in the market.

In an embodiment, the method of manufacturing a thermal insulating material may include softening date palm surface fibers (DPSF), drying the softened. DPSF, infusing the DPSF with polyvinyl alcohol (PVA), and casting the PVA infused DPSF to produce the thermal insulating material made from date palm surface fibers. The softening may include soaking the DPSF in water for a period of time. The drying may include drying the softened DPSF in an oven, after which the DPSF may be stored at ambient/room temperature for a period of time. The infusion may include soaking the dried DPSF in a PVA solution. The casting may include placing the infused DPSF in a mold and compressing the infused DPSF in a hot press followed by drying the compressed DPSF to produce the thermal insulating material made from DPSF.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A thermal insulating material made from date palm surface fibers is manufactured using waste material from the date palm tree and a binding material that is both odor free and non-toxic in nature. The method of manufacturing the thermal insulating material is simple, cheap, and environmentally safe. The thermal insulating material is highly energy efficient, biodegradable, and non-lethal for human health. The thermal insulating material has great potential to replace the expensive and toxic insulating materials in the market.

As used herein, the term "about" when used to modify a number means within 10% of the modified number.

The thermal insulating material may be formed in various shapes, depending upon the intended application and on the desired materials' physical and chemical properties. In an embodiment, the thermal insulating material can have low thermal conductivity (W/mK).

The method of manufacturing a thermal insulating material may include softening date palm surface fibers (DPSF), drying the DPSF, infusing the DPSF with polyvinyl alcohol (PVA), and casting the PVA infused DPSF to produce the thermal insulating material made from date palm surface fibers. The softening may include soaking the DPSF in water for a period of time. The drying may include drying the softened DPSF in an oven, after which the DPSF may be stored at ambient/room temperature for a period of time. The infusion may include soaking the dried DPSF in a PVA solution. The casting may include placing the infused DPSF in a mold and compressing the infused DPSF in a hot press followed by drying the compressed DPSF to produce the thermal insulating material made from DPSF.

Figure 1:
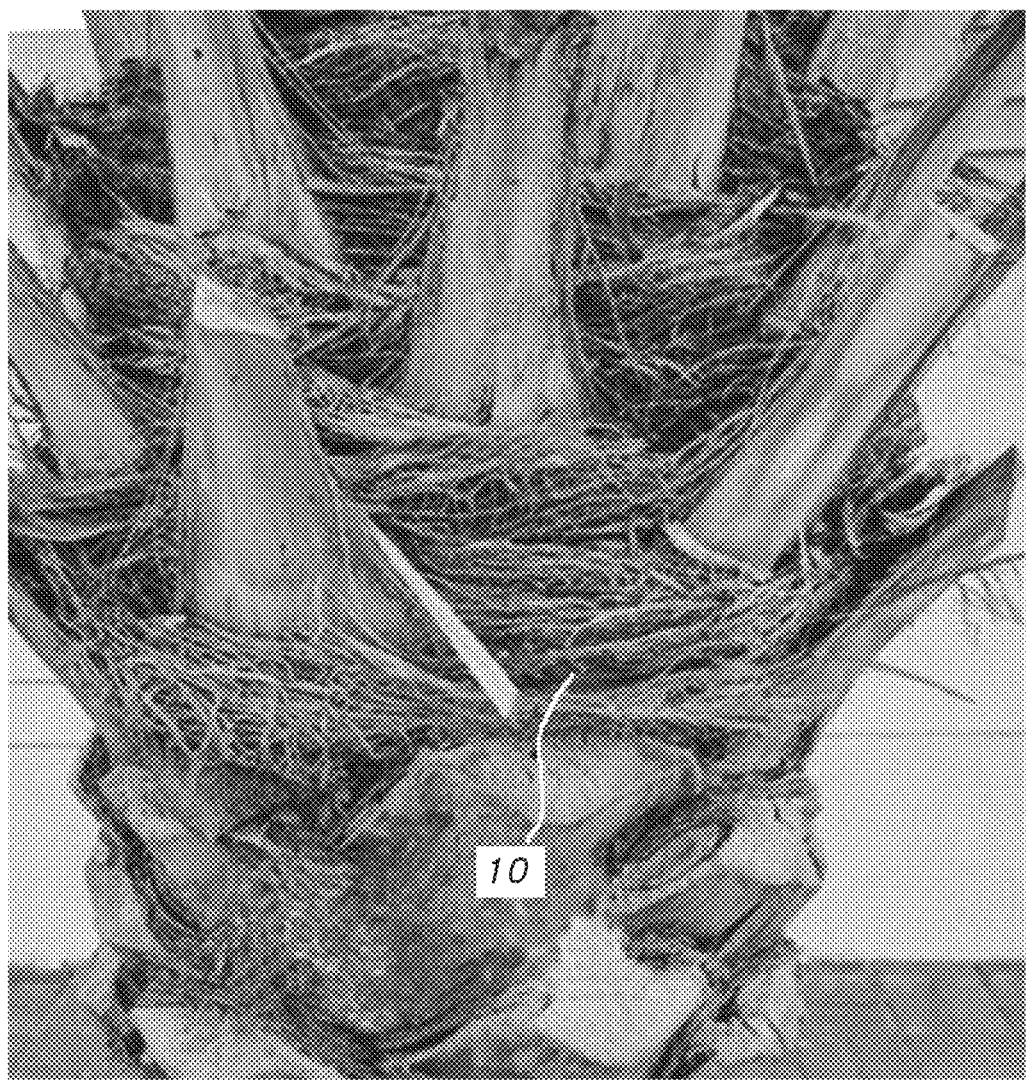
FIG. 1 depicts a date palm tree, illustrating the location of the date palm surface fibers.
Figure 2A:
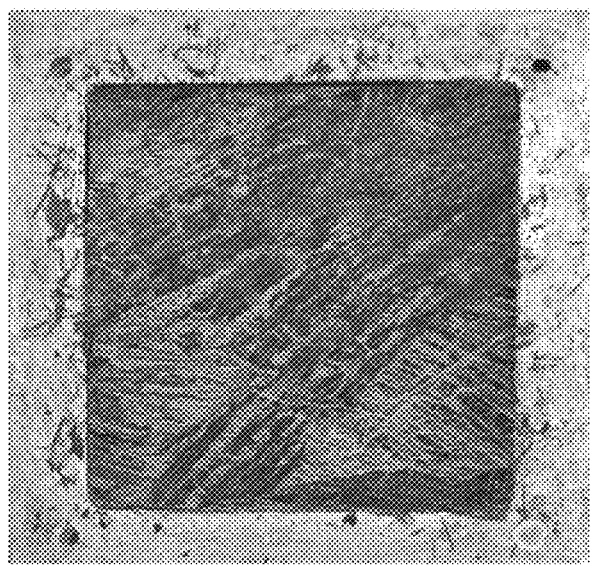
FIG. 2A depicts a mold used for DPSF/PVA composite fabrication filled with DPSF/PVA.
Figure 2B:
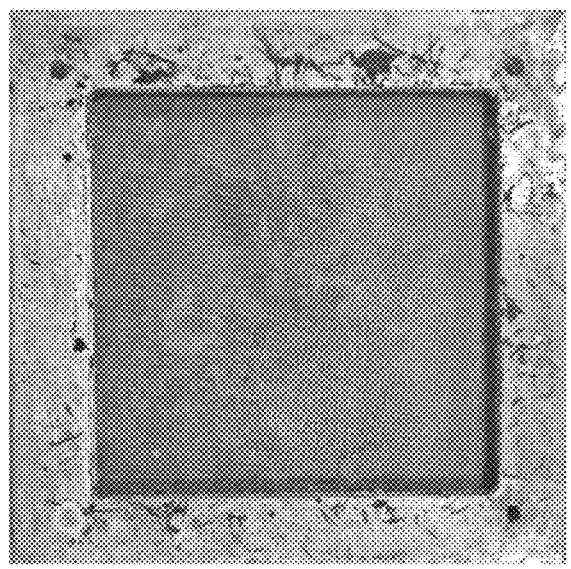
FIG. 2B depicts an empty mold used for DPSF/PVA composite fabrication.

In a preferred embodiment, DPSF may be harvested from date palm trees (*Phoenix dactylifera*). DPSF are generally considered a waste material, naturally produced by the date palm tree. As illustrated in FIG. 1, DPSF (10) are formed as a woven mat of crossed fibers of different diameters, surrounding the date palm tree stem. These fibers may be harvested from what would otherwise be considered date palm waste requiring disposal. Once harvested, the DPSF may then be washed with water to remove any dust or other impurities and softened by immersing the DPSF in water for about 24 hours at ambient temperature and protected from direct sunlight. The washed DPSF can be dried in an oven for about 2 hours and then placed in an open atmosphere for about 2 hours. Optionally, when removed from the water bath, the DPSF may be dried, such as with a paper tissue to remove surface water. A PVA solution may be prepared with 8 wt % PVA dissolved in deionized water, heated to about 230° C. and stirred for about 30 to about 40 minutes, until all of the PVA is dissolved and the solution becomes clear. The DPSF may then be soaked in the PVA solution for about 10 minutes. The DPSF may then be removed from the PVA solution and placed into a mold (FIGS. 2A-2B). The mold may then be cast in a hot press machine at about 70° C. for about 3 hours and under a load of about 3 tons. The resulting compressed DPSF/PVA samples (the thermal insulating material made from DPSF) may then be oven dried for about 48 hours at a temperature of about 100° C. The thermal insulating material made from DPSF may be ready for use when the water content has been completely vaporized. The DPSF/PVA insulating material can have an average fiber diameter ranging from about 1 mm to about 50 µm.

The thermal insulating material may have a thermal conductivity less than about 0.055 W/(mK). In a preferred embodiment, the thermal insulating material may have a thermal conductivity ranging from about 0.038 to about 0.053 W/(mK), The thermal insulating material may have a density ranging from about 203.33 kg/m³ to about 254.01 kg/m³.

Polyvinyl alcohol is a water-soluble synthetic polymer having the chemical formula $[CH_2CH(OH)_n]$. PVA has many uses, including but not limited to papermaking, as a thickener, and as an emulsion stabilizer. PVA is widely used for its emulsifying and adhesive properties, paired with its relatively slow biodegradation.

The molds used in casting the thermal insulting material made from DPSF may be of any shape, size, or dimension suitable for casting using a hot press machine. The molds may define a void having the desired dimensions for the final thermal insulating material. These dimensions may be based upon the dimensions of the space requiring insulation, and may be designed to use multiple units of the cast thermal insulating material in order to provide insulation to a large space (such as one or more walls of a building).

The following examples illustrate the present teachings.

EXAMPLE 1

Production of Thermal Insulating Material Using DPSF

DPSF was washed with tap water to remove any dust or other impurities and softened by immersing the DPSF in water for 24 hours at ambient temperature and protected from direct sunlight. The DPSF was removed from the water bath and dried with paper tissue to remove surface water, followed by further drying in an oven for 2 hours and stored at room temperature. A PVA solution was prepared with 8 wt % PVA dissolved in deionized water, heated to about 230° C., and stirred for about 30-40 minutes, until all of the PVA was dissolved and the solution became clear. The dried DPSF was soaked in the PVA solution for 10 minutes. The PVA-infused DPSF was removed from the PVA solution and placed into a mold having dimensions of 11 cm×11 cm×3 mm (Length×Width×Thickness). The mold was cast in a hot press machine at 70° C. for 3 hours and under a load of 3 tons. The resulting compressed DPSF/PVA samples (the thermal insulating material made from DPSF) were oven dried for 48 hours at a temperature of 100° C. Four samples of the resulting thermal insulating material made from DPSF were then analyzed.

The thermal conductivity of the four samples was in a range of 0.038-0.053 W/(mK). The density of the four samples (mass/volume) was calculated to be 203.33 kg/m³, 227.45 kg/m³, 246.53 kg/m³, and 254.01 kg/m³. Thermogravimetric analysis (TGA and DTA) revealed that the decomposition and degradation temperature of the samples starts at 240° C. with a mass loss of only 10% until this stage. Differential scanning calorimeter (DSC) showed a melting point temperature at endothermic 220° C. Scanning electron microscopy (SEM) revealed that the average fiber diameter is in the range of 1 mm-50 µm. The SEGAL method was used to calculate the samples' crystallinity (Ic). Ic was calculated according to Equation 1, where Ic=crystallinity index, $I_{002}$=counter reading at peak intensity at a 2 θ angle close to 22° representing crystalline material, and $I_{AM}$=counter reading at peak intensity at a 2 θ angle close to 18° representing amorphous material. The DPSF/PVA, determined by the equation below, has a crystallinity index ($I_C$) value nearly 42%.

$$I_C = \left[I_{002} - \frac{I_{AM}}{I_{002}}\right] \times 100 \qquad \text{Equation 1}$$

Figure 3:
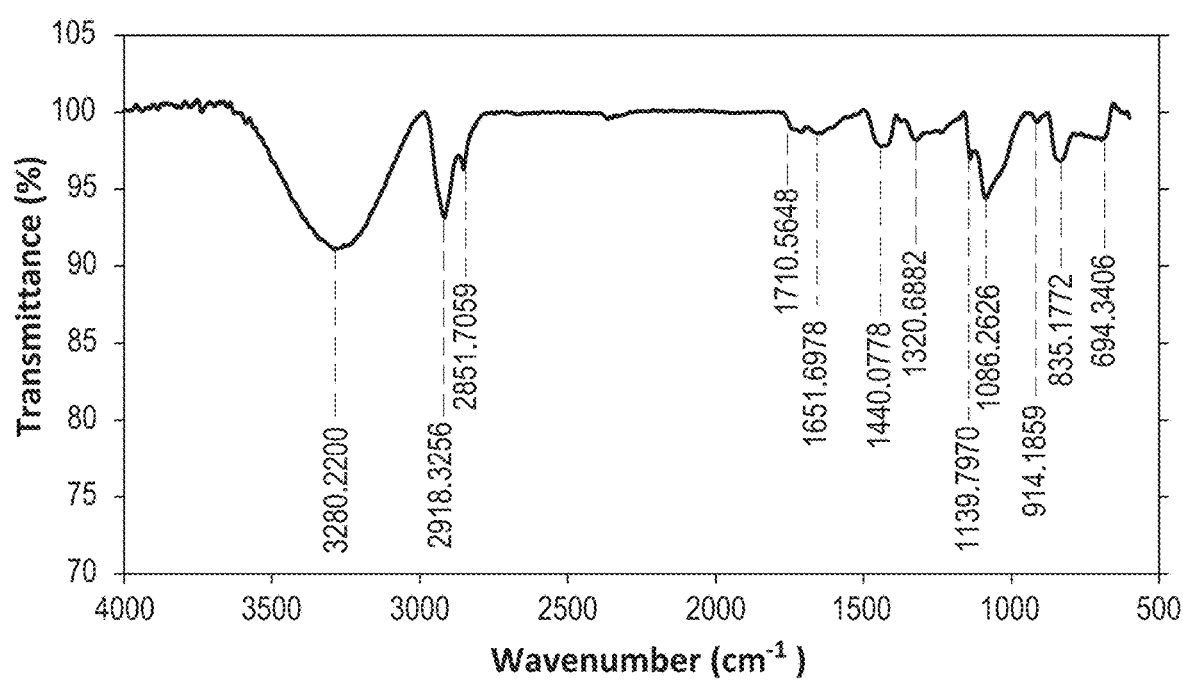
FIG. 3 depicts a FTIR spectrum of a DPSF/PVA composite sample.

Fourier Transformation-Infra Red (FT-IR) analysis displayed various stretching peaks at different wavelengths, correlating to the organic nature of the prepared sample. (See FIG. 3) The analysis of the stretching peaks confirms that carbon, hydrogen, oxygen, sulphur, and nitrogen are the main constituents in the fiber composite. Table 1 present all the elements which are combined in various functional groups. These functional groups are allocated different wavenumbers. These functional groups include hydroxyl (OH), hydrocarbon (C—H), carbonyl (C=O), carbon-carbon (C=C), and others listed in Table 1. The figure shows that there is a medium stretching at 3280 cm−1, which is due to aliphatic primary amine (N—H) group that appears in the sample. There are also two strong alkane: C—H stretching peaks at 2918 cm$^{-1}$ and 2851 cm$^{-1}$. At 1710 cm$^{-1}$ wavelength, there is a strong C=O stretching peak due to aliphatic ketone functional group. Then, there is a medium C=C stretching Peak at 1651 cm$^{-1}$ linked to alkene functional group. There are three more strong stretching peaks at 1320 cm$^{-1}$, 1139 cm$^{-1}$, and 1086 cm$^{-1}$ due to S=O (sulfone), C—O (tertiary alcohol), and C—O (primary alcohol). The first bending peak having medium appearance is at 1440 cm$^{-1}$ due to OH-bending carboxylic acid. The final two are the medium bending peaks at 835 cm$^{-1}$ and 694 cm$^{-1}$ due to C=C alkene functional group.

TABLE 1

Functional Groups of the Wavelength Peaks in FT-IR Analysis

| No. | Wavelength peak (cm$^{-1}$) | Functional group designation |
|---|---|---|
| 1 | 3280 | NH-stretching |
| 2 | 2918 | C—H stretching |
| 3 | 2851 | C—H stretching |
| 4 | 1710 | C=O stretching |
| 5 | 1651 | C=C stretching |
| 6 | 1440 | O—H bending |
| 7 | 1320 | S=O stretching |
| 8 | 1139 | C—O stretching |
| 9 | 1086 | C—O stretching |

TABLE 1-continued

Functional Groups of the Wavelength Peaks in FT-IR Analysis

| No. | Wavelength peak (cm$^{-1}$) | Functional group designation |
|---|---|---|
| 10 | 835 | C=C bending |
| 11 | 694 | C=C bending |

It is to be understood that the thermal insulating material made from date palm surface fibers is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of manufacturing a thermal insulating material made from date palm surface fibers, comprising:
    softening date palm surface fibers (DPSF) to provide a softened DPSF;
    drying the softened DPSF to provide a dried DPSF;
    infusing the dried DPSF with polyvinyl alcohol (PVA) solution to create PVA infused DPSF, wherein the PVA solution comprises about 8 wt % PVA and water;
    casting the infused DPSF to produce a compressed DPSF, wherein the compressing comprises compressing the infused DPSF in a hot press machine at about 70° C. for about 3 hours and under a load of about 3 tons; and
    drying the compressed DPSF to produce the thermal insulating material, the compressed DPSF is dried in an oven for about 48 hours at a temperature about 100° C., wherein the resultant thermal insulating material has a thermal conductivity between 0.038-0.053 W(mK) and has a density between 203.33 kg/m$^3$ and 254.01 kg/m$^3$.

2. The method of manufacturing a thermal insulating material as recited in claim 1, wherein the softening comprises soaking the DPSF in water for a period of time.

3. The method of manufacturing a thermal insulating material as recited in claim 1, wherein the drying comprises drying the DPSF in an oven.

4. The method of manufacturing a thermal insulating material as recited in claim 1, wherein the casting comprises placing the infused DPSF in a mold and compressing the infused DPSF in a hot press machine.

* * * * *